United States Patent [19]
Berrill

[11] Patent Number: 5,793,200
[45] Date of Patent: Aug. 11, 1998

[54] POSITION RESPONSIVE MAGNETIC SENSING ELEMENTS FOR SENSING THE POSITION OF A MEMBER AT A REMOTE SITE

[75] Inventor: Michael J. Berrill, Caithness, Scotland

[73] Assignee: Rolls-Royce and Associates Limited, Derby, England

[21] Appl. No.: 143,227

[22] Filed: Oct. 29, 1993

[51] Int. Cl.$^6$ .............. G01B 7/14; G01D 5/16; G01F 23/60; G01R 33/00
[52] U.S. Cl. .............. 324/207.2; 324/207.12; 324/207.24; 73/313
[58] Field of Search .............. 324/207.11, 207.12, 324/207.13, 207.2, 207.21, 207.22, 207.24, 235, 228, 206, 204, 251, 252, 260, 262; 73/313, 305, 308, 314

[56] References Cited

U.S. PATENT DOCUMENTS

| | | | |
|---|---|---|---|
| 3,419,798 | 12/1968 | Walton | 324/251 |
| 3,423,674 | 1/1969 | Goldsmith et al. | 324/251 |
| 4,054,861 | 10/1977 | Markison | |
| 4,361,835 | 11/1982 | Nagy | 324/207.2 X |
| 4,466,284 | 8/1984 | Dumery | |
| 4,540,964 | 9/1985 | Bleeke | 338/32 H |
| 4,587,509 | 5/1986 | Pitt et al. | 324/251 X |
| 4,589,282 | 5/1986 | Damery | 324/251 X |
| 4,692,703 | 9/1987 | Extance et al. | 324/251 |
| 4,719,420 | 1/1988 | Biomond | 324/207.24 |
| 4,926,121 | 5/1990 | Guay | 324/207.2 |
| 5,056,049 | 10/1991 | O'Neill | |

FOREIGN PATENT DOCUMENTS

| | | |
|---|---|---|
| 0091000 | 10/1983 | European Pat. Off. |
| 0093188 | 11/1983 | European Pat. Off. |
| 0192812 | 9/1986 | European Pat. Off. |
| 2212532 | 7/1974 | France. |
| 2314363 | 10/1974 | Germany. |
| 3510198 | 9/1986 | Germany. |
| 4011858 | 10/1990 | Germany. |
| 1416940 | 12/1975 | United Kingdom. |
| 2211297 | 6/1989 | United Kingdom. |
| 2251694 | 7/1992 | United Kingdom. |
| 8602444 | 4/1986 | WIPO. |
| 9119168 | 12/1991 | WIPO. |
| WO9322623 | 11/1993 | WIPO. |

*Primary Examiner*—Walter E. Snow
*Attorney, Agent, or Firm*—Cushman Darby & Cushman Intellectual Property Group of Pillsbury Madison & Sutro LLP

[57] ABSTRACT

The effective operating range of an actuator magnet on a position detecting array of solid state hall effect devices improved by the use of flux concentrating elements which direct the flux along the array of sensing devices. The flux concentrating elements comprise a series of rods each avowing a magnetic permeability substantially greater than that of free space, such as soft ferrite, which are placed alignment with and between each sensing device in the array.

14 Claims, 2 Drawing Sheets

1

POSITION RESPONSIVE MAGNETIC SENSING ELEMENTS FOR SENSING THE POSITION OF A MEMBER AT A REMOTE SITE

FIELD OF THE INVENTION

The present invention relates to position responsive apparatus utilizing magnetic field sensing, and in particular to improvements in the effective operating distance of actuating and sensing devices thereof.

BACKGROUND OF THE INVENTION

There are many processes in which a directly contacting probe or the like cannot be employed to monitor positional change, for example, because of a hostile environment, the aggressive nature of a material being monitored, or the undesirability of creating a discontinuity in a containment vessel. Non-contacting sensors must then be used, such as devices responsive to magnetic fields. An example of such an apparatus used for liquid level sensing has been described in U.S. Pat. No. 5,565,687 to the present applicant. The aforementioned application describes a magnetic field sensing apparatus to which the present invention is particularly suited, and is set forth in the appendix hereto.

In magnetic field sensing apparatus, the distance between an actuator magnet and one or more sensing devices is an important factor in the correct operation of the apparatus. The medium through which the actuator magnet or magnets must operate upon the sensing device or devices is also an important factor.

In particular, where such sensing apparatus provides an actuator magnet which is in use in a hostile environment, the distance between, and medium separating, the actuator magnet and sensing device may be determined by many other factors. An example of this is where the actuating magnet is provided within a vessel containing high temperature fluid such as in a boiler, and it is necessary to provide adequate thickness of temperature insulation to prevent damage to the sensing devices. It may also be necessary to use a substantial thickness of material in manufacture of the vessel wall in order to provide sufficient mechanical strength, for example, where high pressures are involved.

It is an object of the present invention to provide a means for enhancing the effective operating distance of an actuator magnet on the sensing element.

The present invention provides, in accordance with a preferred embodiment, a position-responsive apparatus comprising a series of magnetic field sensing elements (preferably Hall Effect devices in the form of integrated circuits) disposed in succession alongside a path of relative movement of a non-contacting magnetic actuating means to act upon respective sensing elements by proximity thereto, the apparatus including a magnetic flux concentrating element situated between each adjacent pair of sensing elements in the series of such elements, wherein the flux concentrating elements act to direct the magnetic flux from the actuating means onto the sensing elements in a direction parallel to the path of relative movement of the actuating means.

Preferably, the flux concentrating elements comprise rods of material having a magnetic permeability substantially greater than that of free space, such as ferrite.

The apparatus preferably includes a printed circuit board providing electrical connections to sensing elements mounted at spaced apart positions on said board, the flux concentrating elements being mounted on the board between the sensing element positions.

In the prior art, usefulness of such magnetic position sensors as fluid level indicators for sealed vessels has been restricted by the limited range over which the magnetic field from the actuating magnet has been capable of actuating the sensing devices. This has precluded use in cases where a vessel wall interposed between the sensors and the actuating magnet requires a thick insulation coating. The arrangement adopted by the present invention enables effective level sensing even when the magnetic actuating means is separated from the sensing elements by a thick layer of temperature insulating material (in excess of 30 mm) in addition to a non-magnetic wall of the vessel.

In an advantageous configuration capable of achieving the above performance, the flux concentrating elements have cross-sectional dimensions proximate the sensing devices which correspond substantially with the sensing device dimensions, the flux concentrating elements having a longitudinal dimension approximately four times said cross-sectional dimensions. Sensing elements are preferably solid-state Hall effect devices and may be mutually separated by a distance of approximately 20 mm. The magnetic actuating means may be separated from all of the sensing elements by a distance of at least 10 mm. Furthermore, the non-contacting magnetic actuating means is preferably a ring magnet having a tubular form and comprising a magnetic alloy in which the magnetic crystal domains are oriented lengthwise of the tubular form.

The present invention also provides a method of increasing the effective range of detection of the position of a magnetic actuating means relative to a plurality of magnetic field sensing elements disposed in succession alongside a path of relative movement of the magnetic actuating means, said method including the steps of positioning a flux concentrating element between each pair of said plurality of sensing elements and orienting the flux concentrating elements to direct the magnetic flux from the actuating means onto the sensing elements in a direction parallel to the path of relative movement of the actuating means.

The present invention will now be described, by way of example only, with reference to the following drawings in which.

Figure 1:
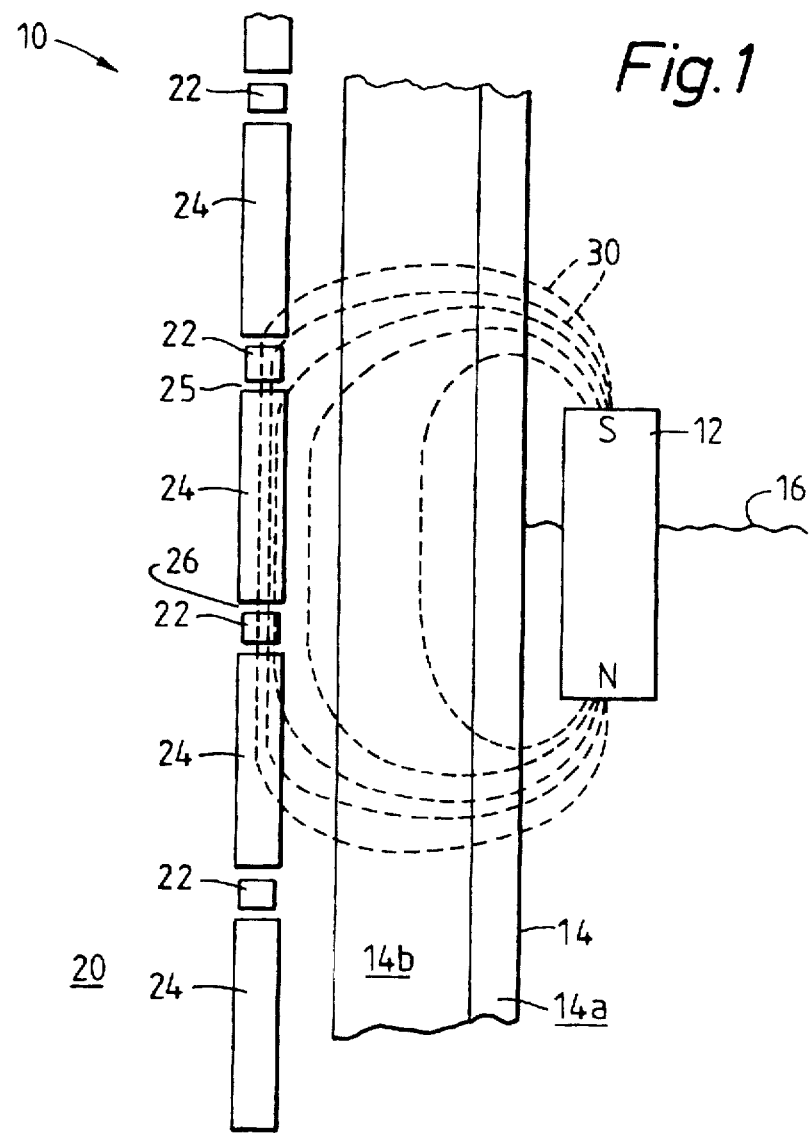
FIG. 1 shows a schematic diagram of a magnetic float gauge system incorporating the present invention.

Referring to FIG. 1, there is shown a liquid level sensing apparatus 10, in the form a magnetic float gauge, including an actuating magnet 12 having north and south poles N, S respectively, which is constrained (by means not shown) to move linearly along a containment vessel wall 14 in accordance with a fluid level 16 therein. The containment vessel wall 14 may, for example include a structural portion 14a of suitable material such as non-magnetic stainless steel, and a substantial thickness of insulating material 14b. On the outside 20 of the containment vessel wall 14, there is provided an array of magnetic field sensing devices 22, for example, solid state Hall effect devices (such as UGS3140U switches supplied by Allegro Microsystems Inc of Worcester, Mass., USA). Each of the sensing devices 22 is separated from the adjacent device 22 by a flux concentrating element 24. The flux concentrating element may be in the form of a ferrite rod, or other material having a suitable value of magnetic permeability which is substantially higher than that of free space.

Magnetic flux density, indicated by magnetic flux lines 30, is concentrated by the ferrite rods 24 to a level substantially greater than that in free space, and flux is directed along the length of any of the rods 24 which are sufficiently close to actuating magnet 12. At each end 25,26 of the ferrite rods 24, the concentrated flux will be directed to the corresponding end of the adjacent ferrite rod which is in close proximal alignment thereto. The relatively small size of the sensing devices 22 located between the adjacent ferrite rods 24 will cause only a small disturbance in the flux path, particularly if the spacing between the ends 25,26 of adjacent ferrite rods 24 and the interposed sensing devices 22 is kept to a minimum. The positioning of the ferrite rods 24 has the effect of maximizing the flux passing through each sensing device.

While the use of ferrite rods is particularly suited to the embodiment described above in terms of cost and weight, it will be understood that any suitable high magnetic permeability substance may be employed as the flux concentrating element.

Figure 2:
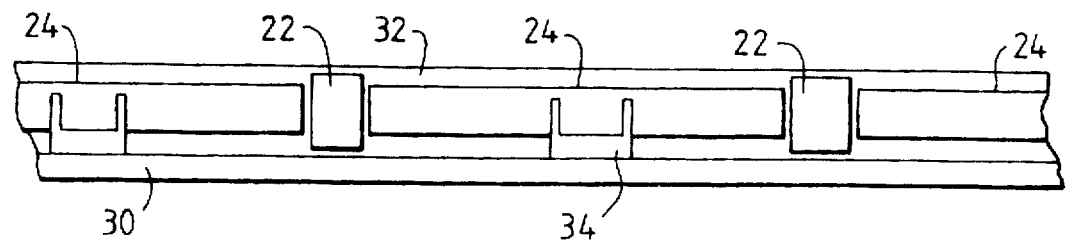
FIG. 2 shows a more detailed schematic diagram of a sensor array suitable for the system of FIG. 1.

With reference to FIG. 2, there is shown a more detailed diagram of the sensing apparatus of FIG. 1. The sensing devices are mounted using known techniques to a printed circuit board 30. Electrical connections to a signal processing circuit (not shown) from each of the sensing devices are made through the board in known manner. A suitable signal processing circuit is fully described in the U.S. Pat. No. 5,565,687.

Individual ferrite rod flux concentrating elements 24 are mounted on the printed circuit board 30 using plastic cradles 34 in known manner. The rods are positioned in mutual alignment on each side of the sensing devices 22, and the completion of the apparatus preferably includes the sealing of the components into a potting compound 32. The rods may, for example, be cylindrical.

In a presently preferred embodiment, there are provided fifty sensing devices 22 with ferrite rods 24 therebetween on a board 30 of approximately one meter in length. A ferrite rod diameter of approximately 5 mm is preferably used which corresponds broadly with the overall sensing device dimensions. In a presently preferred embodiment, each rod has a length of 18.5 mm. This dimension is entirely exemplary, and other configurations may be used. Where a potting compound 32 is used, it is desirable to use a flexible variety such as polyurethane-based, since the overall length of board 30 is such that any differences in thermal coefficients of expansion between board 30 and compound 32 will require relative movement thereof to prevent mechanical damage to the board and its components.

In a presently preferred embodiment, the use of the chain of ferrite rods 24 has been shown to increase the effective working distance over which the actuating magnet 12 may trigger the sensing devices 22 by a factor of at least six. Using a particular known type of ring magnet operating upon the sensor switches described hereinbefore, effective operation has been shown through a 4 mm vessel wall of stainless steel, 6 mm insulation layer. Total actuator magnet to sensing device distance of in excess of 30 mm has been demonstrated.

The particularly preferred form of actuating magnet for use in the float 12 comprises a magnetic alloy ring of squat tubular form about 20 mm long, with a 40 mm outside diameter and a 27 mm inside diameter. The preferred magnetic alloy is known as Alcomax 3 in the United Kingdom (Alnico 5 in U.S.A.) and is characterized by metallurgical crystal growth oriented along its length, so that the magnetic domains therein are similarly oriented. North and south magnetic poles are therefore at longitudinally opposed ends of the tubular form. This type of magnet is available from Sermag Limited, of 94 Holywell Road, Sheffield, England.

It will be understood that use of known flux concentrating materials of higher relative magnetic permeability than ferrite will result in further improvement in working distance.

Figure 3:
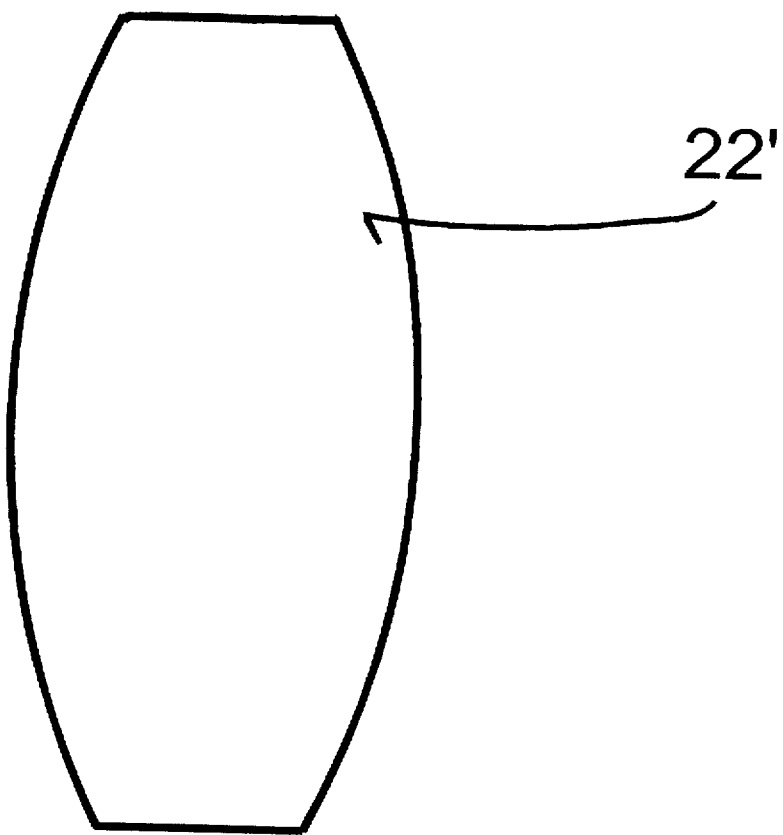
FIG. 3 shows a detailed schematic view and elevation of a modified version of a flux concentrating member of the present invention.

It will also be understood that for further sensitivity improvement, modification of the shape of the flux concentrators may be employed as shown in FIG. 3 at 22', in which the diameter of the ferrite rods 24 is greater in the centre portion of the rod and smaller at each end thereof in order to focus the flux more precisely to the sensing device, while in general providing a larger overall volume of material for the passage of flux.

Although the invention has been illustrated by its application to a liquid level indicator comprising a linear chain of flux concentrators, it will be understood that it is capable of being employed for other kinds of position indication, including rotary position. It will also be understood that a single sensing device may be used with one or more flux concentrators situated in suitable positions adjacent thereto.

What is claimed is:

1. Position-responsive apparatus comprising a series of magnetic field sensing elements successive members of which are disposed a first distance apart from each other alongside a path of relative movement of a non-contacting magnetic actuating means to act upon respective sensing elements by proximity thereto, said magnetic actuating means being separated from said sensing elements by a second distance, said apparatus including a magnetic flux concentrating element extending over substantially all of said first distance, between each adjacent pair of said series of sensing elements, wherein the flux concentrating elements act to direct the magnetic flux from the actuating means onto the sensing elements in a direction parallel to the path of relative movement of the actuating means, said sensing elements comprising solid-state Hall effect devices, the flux concentrating elements being selected from the group comprising ferrite members and members with a higher relative magnetic permeability than ferrite and said magnetic actuating means being separated from all of said solid-state Hall effect devices by a distance of at least 10 mm.

2. Position-responsive apparatus according to claim 1, including a printed circuit board providing electrical connections to said sensing elements mounted at spaced apart positions on said board, said flux concentrating elements being mounted on said board between said sensing element positions.

3. Position-responsive apparatus according to claim 1, wherein said magnetic actuating means is separated from said sensing elements by a layer of temperature insulating material.

4. Position-responsive apparatus according to claim 1, wherein said sensing elements are mutually separated by a distance of approximately 20 mm, and said magnetic actuating means is separated from all of said sensing elements by a distance of at least 10 mm.

5. Position-responsive apparatus according to claim 1, wherein proximate said sensing devices, said flux concentrating elements have cross-sectional dimensions corresponding substantially with the sensing device dimensions, the flux concentrating elements having longitudinal dimension approximately four times said cross-sectional dimensions.

6. Position-responsive apparatus according to claim 1, wherein said non-contacting magnetic actuating means comprises a ring magnet of tubular form and comprising a magnetic alloy in which the magnetic crystal domains are oriented lengthwise of the tube.

7. A method of increasing the effective range of detection of the position of a magnetic actuating means relative to a series of magnetic field sensing elements successive members of which are disposed a first distance apart from each other alongside a path of relative movement of the magnetic actuating means, said magnetic actuating means being separated from said sensing elements by a second distance, said method including the steps of positioning a flux concentrating element between each pair of said series of sensing elements and orienting the flux concentrating elements to direct the magnetic flux from the actuating means onto the sensing elements in a direction parallel to the path of relative movement of the actuating means, and said sensing elements comprising solid-state Hall effect devices, the magnetic flux concentrating elements being selected from the group comprising ferrite members and members with a higher relative magnetic permeability than ferrite and said magnetic actuating means being separated from all of said solid-state Hall effect devices by a distance of at least 10 mm, each said flux concentrating element extending over substantially all of said first distance between each pair of sensing elements.

8. Position responsive apparatus according to claim 1 wherein said second distance is about one and a half times said first distance.

9. Position responsive apparatus according to claim 1 wherein said second distance is at least 30 mm.

10. Position responsive apparatus according to claim 1 wherein the flux concentrating members are rods, the flux concentrating rods having ends, a center portion and a diameter, the diameter of the center portion of the flux concentrating rods is greater than the diameter of the ends of the flux concentrating rods to focus the flux more precisely on the solid-state Hall effect devices.

11. The method as claimed in claim 7 including the step of separating said magnetic actuating means by a distance of one and a half times said first distance.

12. The method as claimed in claim 7 wherein said second distance is at least 30 mm.

13. The method as claimed in claim 7 including the step of using rods as said flux concentrating members with said flux concentrating rods having ends, a center portion and a diameter, the diameter of said center portion of said rods being greater than the diameter of the ends of said flux concentrating rods to focus the flux more precisely on said solid-state Hall effect devices.

14. A liquid level sensing apparatus comprising a non-contacting magnetic actuating means, a liquid containing vessel, a temperature insulating material around the vessel, a series of magnetic field sensing elements disposed outside the temperature insulating material with said magnetic field sensing elements having successive members disposed a first distance apart from each other alongside a path of relative movement of said non-contacting magnetic actuating means to act upon respective sensing elements by proximity thereto, said magnetic actuating means being separated from said sensing elements by a second distance, said apparatus including a magnetic flux concentrating element extending over substantially all of said first distance, between each adjacent pair of said series of sensing elements, said sensing elements comprising solid-state Hall effect devices, the magnetic flux concentrating elements being selected from the group comprising ferrite members and members with a higher relative magnetic Permeability than ferrite and said magnetic actuating means being separated from all of said solid-state Hall effect devices by a distance of at least 10 mm wherein the flux concentrating elements act to direct the magnetic flux from the actuating means onto the sensing elements in a direction parallel to the path of relative movement of the actuating means.

* * * * *